United States Patent
Melamed et al.

(10) Patent No.: US 8,913,891 B2
(45) Date of Patent: Dec. 16, 2014

(54) TECHNIQUE FOR BLOCKING OF OPTICAL CHANNELS

(75) Inventors: Amitay Melamed, Moshav Satariya (IL); Shai Stein, Hod Hasharon (IL)

(73) Assignee: ECI Telecom Ltd., Petach-Tikva (IL)

( * ) Notice: Subject to any disclaimer, the term of this patent is extended or adjusted under 35 U.S.C. 154(b) by 311 days.

(21) Appl. No.: 13/453,313

(22) Filed: Apr. 23, 2012

(65) Prior Publication Data

US 2012/0275794 A1 Nov. 1, 2012

(30) Foreign Application Priority Data

Apr. 28, 2011 (IL) .......................................... 212572

(51) Int. Cl.
*H04J 14/02* (2006.01)
*H04B 10/08* (2006.01)
*H04B 10/06* (2006.01)

(52) U.S. Cl.
CPC ......... *H04J 14/0204* (2013.01); *H04J 14/0206* (2013.01); *H04J 14/0212* (2013.01)
USPC ................... 398/83; 398/33; 398/79; 398/85; 398/202

(58) Field of Classification Search
CPC    H04J 14/0204; H04J 14/0206; H04J 14/0212
USPC ............. 398/83, 134, 79, 33, 82, 49, 147, 59, 398/81, 185, 192, 50, 208, 65, 202; 359/124, 128, 127, 111, 279; 385/17, 385/19, 24, 10, 46, 27, 484, 3
See application file for complete search history.

(56) References Cited

U.S. PATENT DOCUMENTS

| | | | |
|---|---|---|---|
| 5,959,749 A * | 9/1999 | Danagher et al. | 398/83 |
| 7,123,845 B2 * | 10/2006 | Matsuyama | 398/208 |
| 7,660,537 B2 * | 2/2010 | Fishman et al. | 398/193 |
| 8,452,180 B2 * | 5/2013 | Gao | 398/85 |
| 8,744,262 B2 * | 6/2014 | Barnard | 398/49 |
| 2001/0041548 A1 * | 11/2001 | Bult et al. | 455/252.1 |
| 2004/0037572 A1 * | 2/2004 | Matsuyama | 398/208 |
| 2004/0109685 A1 * | 6/2004 | Wan et al. | 398/41 |
| 2006/0210211 A1 * | 9/2006 | Taylor | 385/1 |
| 2008/0138066 A1 * | 6/2008 | Zhu et al. | 398/39 |
| 2009/0207489 A1 * | 8/2009 | Futami et al. | 359/495 |
| 2009/0237285 A1 * | 9/2009 | Schemmann et al. | 341/144 |
| 2010/0172437 A1 * | 7/2010 | Brown et al. | 375/296 |
| 2010/0196015 A1 * | 8/2010 | Gutin et al. | 398/141 |
| 2010/0284696 A1 * | 11/2010 | Gao | 398/85 |
| 2011/0110660 A1 * | 5/2011 | Taylor | 398/34 |
| 2011/0135301 A1 * | 6/2011 | Myslinski et al. | 398/34 |
| 2011/0135305 A1 * | 6/2011 | Barnard | 398/49 |
| 2011/0158641 A1 * | 6/2011 | Barnard et al. | 398/25 |
| 2011/0158658 A1 * | 6/2011 | Myslinski et al. | 398/208 |
| 2012/0189311 A1 * | 7/2012 | Buchali et al. | 398/85 |
| 2013/0028604 A1 * | 1/2013 | Gao | 398/65 |
| 2013/0209095 A1 * | 8/2013 | Barnard et al. | 398/34 |

* cited by examiner

*Primary Examiner* — Ken Vanderpuye
*Assistant Examiner* — Abbas H Alagheband
(74) *Attorney, Agent, or Firm* — Novick, Kim & Lee, PLLC; Harold L. Novick; Jae Youn Kim

(57) ABSTRACT

A method and a Reconfigurable Optical Add Drop Multiplexer (ROADM) where blocking of a first optical signal carried over a specific optical channel in the ROADM is performed by compensating the first optical signal by a second optical signal created for that purpose.

4 Claims, 3 Drawing Sheets

TECHNIQUE FOR BLOCKING OF OPTICAL CHANNELS

CROSS-REFERENCE TO RELATED APPLICATIONS

This application claims priority of Israel Patent Application No. IL-212572, filed Apr. 28, 2011, the disclosure of which is incorporated by reference herein in its entirety.

FIELD OF THE INVENTION

The present invention relates to a technology for blocking of spectrum/data transmitted in optical channels, in equipment utilized in optical networks.

BACKGROUND

Operations with various optical channels in an optical network are usually performed by optical equipment pieces, such as OADM (Optical Add Drop Multiplexer), ROADM (Reconfigurable OADM), optical switches WSS (Wavelength Selective Switch), etc. The basic functions of the optical equipment handling optical channels are as follows: passing some of the received optical channels through the equipment without changes, dropping some of the received optical channels and adding some new optical channels. For performing the basic functions optical equipment/device must be able to block one or more optical channels from passing through the device.

Usually, the blocking function is performed using optical filters. Another accepted way to block one or more specific optical channels is to accomplish a pair of actions: de-multiplexing and multiplexing performed so that the specific "unnecessary" optical channels are ignored (not multiplexed) and therefore not included in the group of channels outgoing from the device. The disadvantage of these known blocking operations lay in the non-perfect character of existing modern filters, which (when blocking a channel) usually block/cancel about 40% of the bandwidth surrounding the channel. Such an effect is negligible when spacing between channels is quite large and there is no strong need of compressing the channels and saving the bandwidth. However, bandwidth becomes more and more significant so that a shortage of bandwidth starts to become a problem for providers of modern communications (especially in high rate communication systems). In view of that, the use of current optical filters in high bit rate systems seems more and more problematic, especially for blocking optical channels.

It should be noted that there are some known technologies of suppressing optical signals for security purposes. For example: U.S. patent publication 2010196015A describes a technique for securing data transmission via an optical communication line comprising an optical fiber extending between a first network element and a second network element. The technique described comprises conveying a first optical signal carrying data via an optical fiber from a first network element towards a second network element at a predetermined optical wavelength, and conveying a second optical signal at the same predetermined optical wavelength via the same fiber in the opposite direction. This creates within the optical fiber a combined optical signal such that combination of the first and second optical signals is adapted to hamper an unauthorized non-intrusive extraction of the first optical signal from the combined optical signal.

The presently used filters do not seem to provide an adequate solution for accurately blocking an optical signal of a specific channel in modern optical equipment, such as ROADMs.

SUMMARY OF THE DISCLOSURE

An object of the present invention is to introduce a new approach for blocking/suppressing optical signals of specific optical channels in optical equipment. More specifically the approach is blocking/suppressing optical signals of specific optical channels in Reconfigurable OADM devices (ROADM).

The proposed concept is an alternative approach which is compensating/cancelling a first optical signal (information signal) carried over an optical channel to be blocked, by a second optical signal being substantially opposite in phase and substantially equal by amplitude. The word "substantially" should be understood as expressing the accuracy presently available from the equipment utilized to implement the concept. Such a process is proposed to be performed in optical equipment, preferably in ROADM, for blocking spectrum/data carried over one or more through (express) optical channels.

The proposed solution is extremely relevant today, since current filters are not sharp enough. However, even if the filters improve in the future, each of them will always remain constant from the point of its working spectrum/bandwidth. For that reason even if sharper filters become widely used, the optical channels will become denser, so the filters will still not be sufficiently accurate for a specific channel since any filter selected for a specific channel has quite broad margins affecting the neighboring channels. Therefore, the proposed solution will remain applicable for blocking optical channels also in future optical networks.

According to one embodiment of the invention a method is provided for blocking a first optical signal being carried via an optical channel in a communication network (e.g. within an optical ROADM device), by creating a second optical signal being capable of suppressing the first optical signal, and by further combining the first signal and the second signal to obtain a third signal where the first signal and the second signal are mutually suppressed. The step of creating the second signal is preferably based on Digital Signal Processing (DSP) of the first signal.

The first optical signal is usually called an "information signal". Generally, the first optical signal may be an analogous signal/spectrum propagating over an optical fiber.

The discussed suppression can be also called cancellation, compensation, phase destruction by means of the second optical signal being identically modulated, but being opposite to the first optical signal in phase and amplitude.

More specifically, the step of creating the second optical signal may comprise digitizing the first optical signal. For example by performing digital signal processing (DSP) of the first optical signal, such as inverting a result, and producing the second optical signal by de-digitizing the inverted result.

The proposed approach can in one embodiment be implemented, for example, by utilizing the concept of an optical receiver which is capable of receiving an original analogous signal and digitizing it (e.g. using a receiver for Dual Polarization Quadrature Phase Shift Keying 1000 Gb Optical Transport Network signal, also known as DP QPSK 100 Gb OTN signal), and by "inversively repeating" it for building an optical transmitter which would generate an opposite signal from the original signal to be blocked. The opposite signal substantially has the opposite phase and substantially equal amplitude to the original one, it might then be summed with the original signal. The original signal may be delayed to take into account time required for creating the second, opposite signal. Thus the sum of the original signal and the opposite signal should be zero. In other words the first, original signal and the second, opposite signal would be mutually annihilated/suppressed/cancelled/compensated.

As has been mentioned, the proposed blocking operation can be performed, for example, within an ROADM (Reconfigurable Optical Add Drop Multiplexer). According to an embodiment of the invention the blocking operation may at least partially be implemented together with an adding operation, within an adding block of the ROADM. To achieve the desired accuracy of the method, the result of blocking may be corrected by providing a feedback connection for adjusting the second signal based on monitoring of the third signal.

According to a second aspect of the invention, there is proposed a new concept of a Reconfigurable OADM (ROADM), based on performing DSP processing of optical signals. Preferably, the DSP processing is utilized for cancelling spectrum of one or more through-going (so-called "through" or "express") optical channels.

In this specific embodiment, the ROADM comprises an input line, an output line, a drop unit, an add unit and a through line, The ROADM can further include:

a digitizing unit for digitizing a first optical signal carried over a specific optical channel, a processing unit for inverting a result of digitizing, a de-digitizing unit for creating from the inverted result a second optical signal for suppressing the first optical signal, and a combining unit for combining the first signal and the second signal to obtain a third signal in which the first signal is suppressed.

Each of said digitizing and de-digitizing units preferably comprises means for analog to digital (A/D) or digital to analog (D/A) conversion.

In one embodiment, the drop unit of the ROADM comprises A/D means and a first DSP block, while the add unit of the ROADM comprises a second DSP block and D/A means, such that the drop unit serves as the digitizing unit, one or both of the DSP blocks serve as the processing unit, and the add unit serves as the de-digitizing unit and the combining unit.

According to another embodiment the ROADM may comprise a delay device in its through line. The ROADM may further comprise a feedback connection between the ROADM output line and one or both of the ROADM drop unit and ROADM add unit, for adjusting the second optical signal.

BRIEF DESCRIPTION OF THE DRAWINGS

The above invention will be further described and illustrated with the aid of the following non-limiting drawings in which.

DETAILED DESCRIPTION

Figure 1:
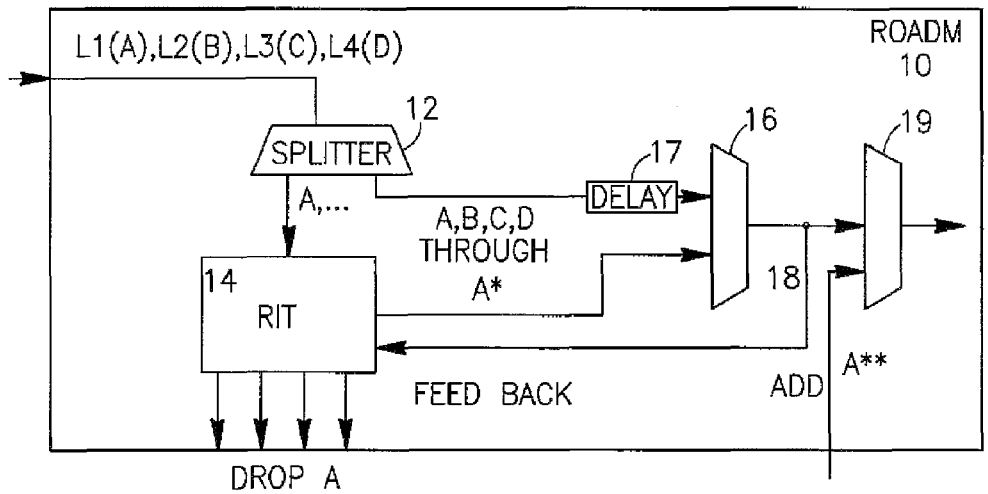
FIG. 1 is a schematic block diagram of a system implementing one version of the method according to the invention for a case of an exemplary optical incoming signal.

FIG. 1 according to a first embodiment of the invention shows a generalized example of how the proposed blocking of an optical channel L1 can be organized in an optical switching device, for example in an ROADM 10.

An exemplary group of incoming optical channels L1-L4 are modulated and carry data A, B, C and D respectively. Assuming a channel L1 (i.e., data A carried by channel L1) should be dropped. An optical splitter 12 receives the incoming signal and separates the optical signal, so that one portion of it (with all optical channels) is sent to a combined unit called Receiver & Inverter & Transmitter (RIT) 14. The other portion of the original signal (comprising all optical channels) is sent as through channels to a combiner (summating block) 16. A delay line 17 is provided to regulate phase of the through signals to be summed with the inverted signal A*. It should be noted that no filter is provided for channel L1, so it remains among the through channels and arrives to the block 16.

The combined RIT 14 receives the data signal A transmitted via the optical channel L1, and performs an inversion of it, The inverted signal is then transmitted to the combiner block 16. For the sake of simplicity the inverted signal is marked A* in the present disclosure (in the art the inverted signal is sometimes designated as −A). This inverted signal A* has an opposite phase (shifted to 180°) with respect to the data signal A, and comprises modulation pulses having substantially equal amplitudes but the opposite sign to those of the data signal A. While summing the input signals in block 16, the inverted signal A* thus blocks the original data signal A by compensating/cancelling it. In order to ensure the required accuracy of the opposite signal A*, a feedback line 18 is provided to adjust the inverted signal A* so that signal A is completely annihilate signal A from the through channels. New data (A**) is applied to the same channel L1 (now free) and then added to the through channels at a Multiplexer 19.

Figures 2A, 2B:
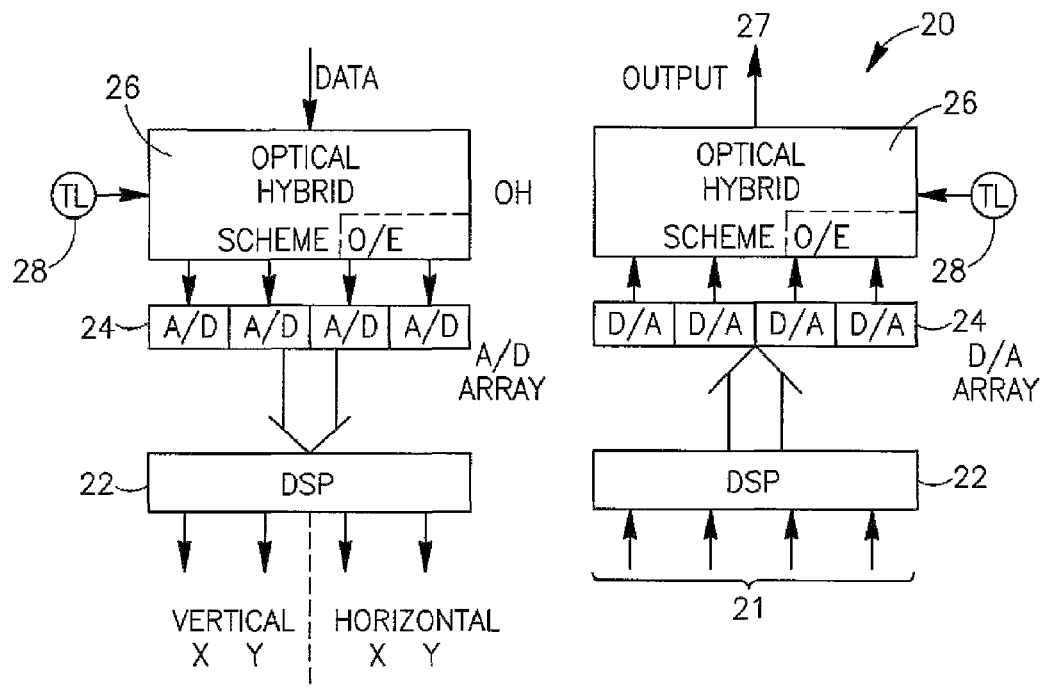
FIG. 2A is a schematic block diagram that shows one known structure of a high bit rate optical receiver.
FIG. 2B is a schematic block diagram that illustrates one proposed structure of a high bit rate optical transmitter.

FIGS. 2A and 2B describe exemplary implementations of a receiver and a transmitter for a dual polarization (DP) Quadrature Phase Shift Keying (QPSK) 100 GB Ethernet optical signal, which are used in this description as examples for realization of the present invention.

FIG. 2A shows a known structure of an optical receiver which obtains an incoming DP-QPSK signal at an Optical Hybrid scheme. Data A of the channel to be blocked is separated by a tunable laser TL. The tunable laser TL extracts four component signals. These signals are electric ones (the Optical Hybrid Scheme comprises an O/E block inside) transmitted at different polarization sub-planes over the optical channel L1. These four component analog signals are fed to an A/D array, comprising four A/D converters respectively converting the four component analog signals into four component digital signals. These digital signals are inputted into a DSP (digital signal processing) block which produces a combined signal from the four component ones and derives data A there-from. Thus DSP block outputs four respective component data signals at four polarization sub-planes, two signals X and Y at a vertical plane of polarization and two signals X, Y at a horizontal plane of polarization.

FIG. 2B shows one implementation of a digital optical transmitter 20, which is required for implementing the present invention, for example in a Reconfigurable OADM operating in a 100 Gb Ethernet 32 GHz optical network.

It is known in the art, that an optical signal, modulated according to a dual polarization scheme (DP-QPSK), can be received and digitized using a receiver schematically shown in FIG. 2A. The present invention provides a method and apparatus not known in the prior art to perform an inverse operation, i.e. to create an analogous optical signal (DP-QPSK), having the same order of bit rate, based on four component digital signals.

In this example, four electric high bit rate data signals marked 21, are fed to a Digital Signal Processing (DSP) unit 22 where they are processed to provide spectrum/echo cancellation of A, and then passed respectively via an array 24 of four D/A converters so as to form four analog modulation signals for four polarization sub-planes of a DP-QPSK signal. These four analog modulation signals are inputted to a Hybrid Optical Scheme 26 which combines a carrier signal using a tunable laser 28 with the modulation signals in four component sub-planes of polarization (two signals in each plane). The resulting signal is provided at the output 27 of the transmitter 20. A transmitter as shown in FIG. 2B, can be built and forms a part of a system proposed below in FIG. 3 for that exemplary case of a 100 Gb network.

Figure 3:
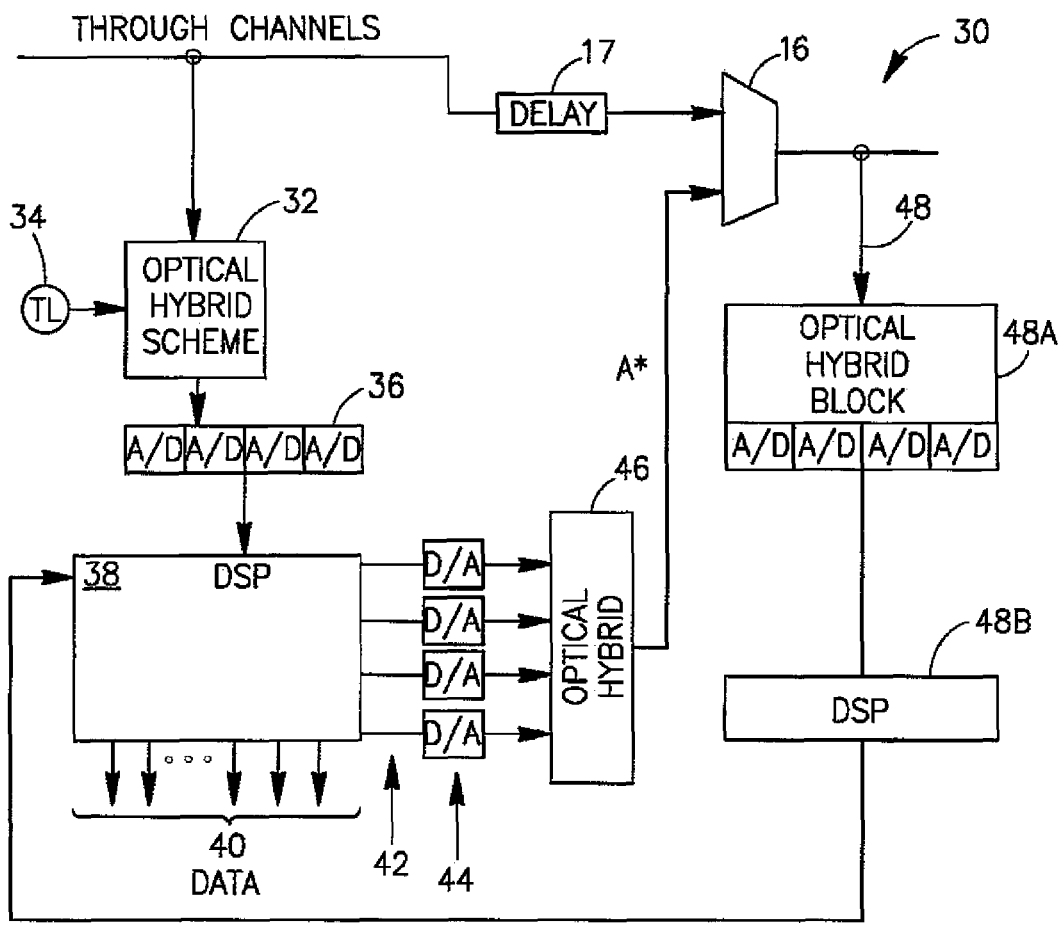
FIG. 3 is a schematic block diagram of an embodiment of the system shown in FIG. 1, using the transmitter of FIG. 2B.

FIG. 3 shows one possible perspective implementation 30 of the general scheme of FIG. 1, by utilizing the transmitter of FIG. 2B. A Hybrid optic block 32 (e.g. a modulation block performing a dual polarization QPSK modulation format) combines an optical carrier using a tunable laser 34 (e.g. tuned to the wavelength L1) with optical signals of the "through channels line" comprising data A, thereby deriving data A. The resulting signal of the mentioned format is digitized by utilizing four A/D converters 36 and fed to a Digital Signal Processing unit (DSP) 38. Regular outputs 40 of the DSP block can be used for dropping data in the form of electric sub-signals, which in this example is data A. Additional data outputs 42 are actually cancellation info outputs utilized for converting data A into inversed analog signals (having opposite phase and amplitude related to data A). The conversion may be performed as it is shown in FIG. 3, but may be done within the DSP unit 38. In FIG. 3, four digital sub-signals 42 outputted by 38 are converted by four D/A converters 44, into analog DSP sub-signals which are then applied to the carrier in a hybrid optical unit 46. In this case, the carrier may be supplied from the same tunable laser block 34 adjusted to produce L1. An hybrid optical unit 46 performs the modulation and forwards the obtained combined signal to the summator (combiner) 16, where the inverted signal A* (−A) meets the original delayed signal A in the same channel L1, just being delayed by the delay line 17, so as to make the signals compatible. In order to ensure the complete compensation, a feedback line 48 is formed between the output of block 16 and the DSP block 38. The feedback connection can also comprise an assembly similar to the transmitter 20 of hybrid optics block (48A), with the array of A/D converters and its own DSP block (48B) for forming a digital reference signal for the DSP processor 38.

It should be noted, that the proposed double DSP processing of an optical signal to be blocked, produces a signal which could precisely cancel the original signal in its exact bandwidth and would not harm neighboring signals.

Figure 4:
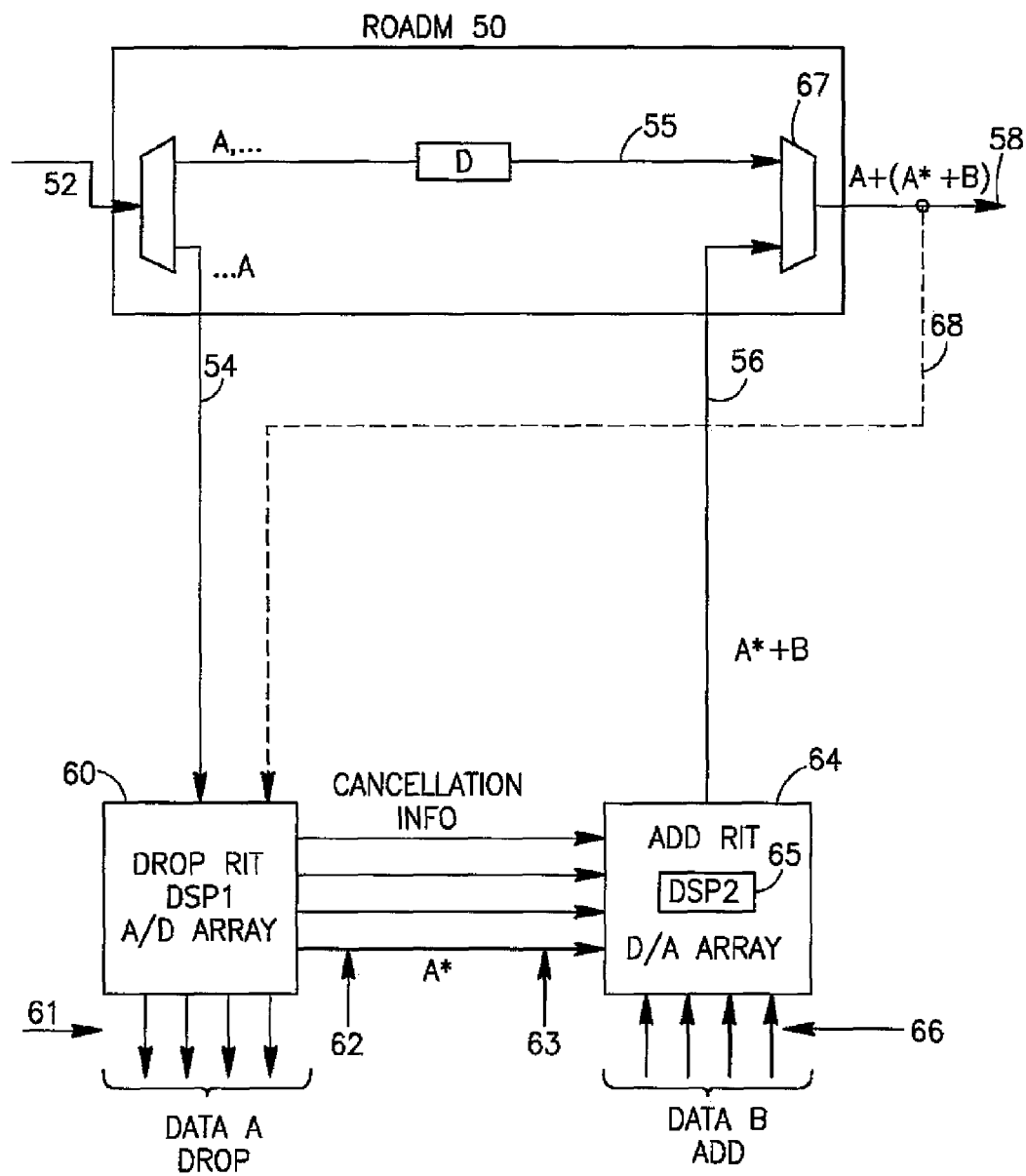
FIG. 4 is a schematic block diagram of yet another embodiment of the present invention within an ROADM.

FIG. 4 schematically shows an ROADM 50, where there is an input 52 line of incoming optical channels, a line of dropped channels 54, a through line of express channels 55 a line of added channels 56 and 58 is an output line of outgoing channels. The drawing can be schematically divided into a drop unit at the left side and an add unit at the right side. For the sake of illustrative simplicity, the example is also built for DP-QPSK high bit rate optical signals.

Dropped channels line 54 is equipped with one or more receivers such as block 60, which comprises a DSP unit and an array of A/D converters. Digital signals 61 form data A to be dropped from channel L1, however the same data A is outputted from contacts 62 as cancellation info A* which via inputs 63 is fed to a transmitter 64, more particularly to its internal DSP unit (DSP2) 65. The DSP unit 65 also obtains data B (to be added to the channel L1 of the dropped data A) from inputs 66 of the transmitter 64. Within the DSP unit 65, the cancellation info of data A is inverted (A being shown with the star sign) and summed with data B.

When the resulting data (A*+B) arrives to the combiner 67, it is summed with the delayed data A of the same channel L1, so ROADM 50 at its output line 58 forms an output optical signal where data A is suppressed/blocked at channel L1, and data B1 is added to the freed channel L1 (*A+A+B).

In order to adjust the second signal (phase and amplitude) a feedback connection 68 is connected between the output line 58 and the drop unit 60. Alternatively, to provide feedback, line 68 could be connected between the output line 58 and the add unit 64. In the first case the A/D converters of the drop unit, intermittently or from time to time, may be used for digitizing the signal obtained from the output line 58. Accordingly, the first DSP block (DSP1) located in the drop unit 60 may be used for adjusting the cancellation info based on the information received from output line 58. In an alternative case, the feedback connection 68 may be provided with its own A/D converter means (not shown in the figure). Also the DSP block DSP2 of the add unit 64 can be utilized for correcting the cancellation info based on the feedback information and thus obtaining the adjusted combined signal. According to another embodiment, the feedback connection 68 may be distributed and provided between the output line 58 and both the add unit and the drop unit of ROADM 50.

It should be appreciated that other implementations of the described concept could be proposed, which may depend on specific parameters of the optical signals to be blocked, as well as on the optical network and the optical equipment where the blocking system is to be installed; such additional implementations are to be considered part of the invention as far as being defined by the claims which follow.

The invention claimed is:

1. A Reconfigurable Optical Add Drop Multiplexer (ROADM) comprising an input line, an output line, a drop unit, an add unit and a through line, the ROADM further comprising:
   a digitizing unit for digitizing a first optical signal carried over a specific optical channel,
   a processing unit for inverting a result of digitizing,
   a de-digitizing unit for creating from the inverted result a second optical signal being capable to suppress the first optical signal,
   a combining unit for combining the first signal and the second signal to obtain a third signal where the first signal and the second signal are mutually suppressed, and
   a feedback connection between the output line and one or both of the drop unit and the add unit, for adjusting the second optical signal.

2. The ROADM according to claim 1, wherein each of said digitizing and de-digitizing units preferably comprises means for analog to digital (A/D) or digital to analog (D/A) conversion.

3. The ROADM according to claim 1, wherein: the drop unit of the ROADM comprises A/D means and a first DSP block, while the add unit of the ROADM comprises a second DSP block and D/A means, so that the drop unit serves as the digitizing unit, one or both of the DSP blocks serve as the processing unit, and the add unit serves as the de-digitizing unit and the combining unit.

4. The ROADM according to claim 1, further comprising a delay device in the ROADM through line.

\* \* \* \* \*